US009920159B2

(12) United States Patent
Prissok et al.

(10) Patent No.: US 9,920,159 B2
(45) Date of Patent: Mar. 20, 2018

(54) REDUCED DISCOLORATION OF THERMOPLASTIC POLYURETHANES BASED ON POLYMER POLYOLS VIA INCORPORATION OF ALIPHATIC ISOCYANATES

(71) Applicant: BASF SE, Ludwigshafen (DE)

(72) Inventors: Frank Prissok, Lemfoerde (DE); Henning Wettach, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/770,224

(22) PCT Filed: Feb. 24, 2014

(86) PCT No.: PCT/EP2014/053504
§ 371 (c)(1),
(2) Date: Aug. 25, 2015

(87) PCT Pub. No.: WO2014/128290
PCT Pub. Date: Aug. 28, 2014

(65) Prior Publication Data
US 2016/0009851 A1  Jan. 14, 2016

(30) Foreign Application Priority Data

Feb. 25, 2013 (EP) ...................... 13156539

(51) Int. Cl.
C08G 18/10 (2006.01)
C08G 18/76 (2006.01)
C08G 18/73 (2006.01)
C08G 18/66 (2006.01)
C08G 18/08 (2006.01)
C08G 18/12 (2006.01)
C09D 175/06 (2006.01)
C08G 18/42 (2006.01)
C08G 18/32 (2006.01)
C08G 18/34 (2006.01)

(52) U.S. Cl.
CPC ......... *C08G 18/73* (2013.01); *C08G 18/0895* (2013.01); *C08G 18/10* (2013.01); *C08G 18/12* (2013.01); *C08G 18/3206* (2013.01); *C08G 18/348* (2013.01); *C08G 18/4238* (2013.01); *C08G 18/664* (2013.01); *C08G 18/7671* (2013.01); *C09D 175/06* (2013.01); *C08G 2350/00* (2013.01)

(58) Field of Classification Search
CPC .... C08G 18/73; C08G 18/0895; C08G 18/10; C08G 18/12; C08G 18/3206; C08G 18/4238; C08G 18/664; C08G 18/7671; C09D 175/06

See application file for complete search history.

(56) References Cited

U.S. PATENT DOCUMENTS

| 3,875,118 A * | 4/1975 | Meisert .................. C08G 18/10 528/45 |
| 2005/0085617 A1* | 4/2005 | Slagel .................... C08G 18/12 528/85 |
| 2007/0049719 A1* | 3/2007 | Brauer ................... C08G 18/10 528/44 |
| 2009/0286950 A1 | 11/2009 | Schumann et al. |
| 2011/0086215 A1* | 4/2011 | Casati .................... C08G 18/12 428/304.4 |
| 2011/0206734 A1 | 8/2011 | Yarema et al. |
| 2011/0237760 A1 | 9/2011 | Schümann et al. |
| 2011/0306734 A1 | 12/2011 | Bräuer et al. |
| 2012/0258269 A1 | 10/2012 | Gehringer et al. |

FOREIGN PATENT DOCUMENTS

| CN | 1919891 A | 2/2007 |
| DE | 196 07 870 A1 | 9/1997 |
| DE | 196 49 290 A1 | 6/1998 |
| DE | 10 2006 009 096 A1 | 9/2007 |
| EP | 0 308 683 A1 | 3/1989 |
| EP | 0 670 339 A1 | 9/1995 |

(Continued)

OTHER PUBLICATIONS

International Search Report dated Apr. 16, 2014 in PCT/EP2014/053504.
International Preliminary Report on Patentability dated May 20, 2015 in PCT/EP2014/053504 (with English language translation).
Office Action dated Jan. 5, 2017 in Chinese Application No. 201480023256.2 with English Translation.

*Primary Examiner* — Michael L Leonard
(74) *Attorney, Agent, or Firm* — Oblon, McClelland, Maier & Neustadt, L.L.P.

(57) ABSTRACT

The present invention relates to a process for producing a polyurethane, comprising at least the following steps (A) bringing at least one polymer polyol into contact with an amount of from 0.1 to 20 mol %, based on the entire amount of polyisocyanate, of at least one first polyisocyanate, in order to obtain a prepolymer which in essence has terminal hydroxy groups, and (B) bringing the prepolymer from step (A) into contact with at least one second polyisocyanate and optionally with further additives, in order to obtain the polyurethane, to a polyurethane obtainable via said process, and also to the use of this polyurethane as cladding in automobiles, coatings, cables, plug connectors, solar modules, foils, moldings, shoe soles and shoe components, balls and ball components, rollers, fibers, profiles, laminates and wiper blades, hoses, cable plugs, bellows, drag cables, cable sheathing, gaskets, nonwoven fabrics, drive belts, or damping elements.

3 Claims, No Drawings

(56) References Cited

FOREIGN PATENT DOCUMENTS

| | | |
|---|---|---|
| EP | 1 273 606 A1 | 1/2003 |
| EP | 1 477 505 A1 | 11/2004 |
| EP | 2 119 735 A1 | 11/2009 |
| EP | 2 392 602 A2 | 12/2011 |
| JP | 5-163431 A | 6/1993 |
| WO | WO 02074826 A1 * | 9/2002 ............ C08G 18/10 |
| WO | WO 2010/031792 A1 | 3/2010 |
| WO | WO 2010/107562 A1 | 9/2010 |
| WO | WO 2011/083000 A1 | 7/2011 |

\* cited by examiner

REDUCED DISCOLORATION OF THERMOPLASTIC POLYURETHANES BASED ON POLYMER POLYOLS VIA INCORPORATION OF ALIPHATIC ISOCYANATES

The present invention relates to a process for producing a polyurethane, comprising at least the following steps (A) bringing at least one polymer polyol into contact with an amount of from 0.1 to 20 mol %, based on the entire amount of polyisocyanate, of at least one first polyisocyanate, in order to obtain a prepolymer which in essence has terminal hydroxy groups, and (B) bringing the prepolymer from step (A) into contact with at least one second polyisocyanate and optionally with further additives, in order to obtain the polyurethane, to a polyurethane obtainable via said process, and also to the use of this polyurethane as cladding in automobiles, coatings, cables, plug connectors, solar modules, foils, moldings, shoe soles and shoe components, balls and ball components, rollers, fibers, profiles, laminates and wiper blades, hoses, cable plugs, bellows, drag cables, cable sheathing, gaskets, nonwoven fabrics, drive belts, or damping elements.

The prior art has already disclosed processes for producing polyurethanes starting from polymer polyols and from polyisocyanates, the intention here being to obtain products that are as far as possible uncolored.

WO 2011/083000 A1 discloses a process for producing polyester polyols, in particular from natural raw materials, and also the further reaction of the polyester polyols described to give polyurethanes with pale intrinsic color and good mechanical properties. In accordance with said document, if the aim is to obtain chemical compounds of this type from renewable raw materials, it is problematic that starting compounds of this type have to be subjected to a further purification step in order to obtain products of this type which satisfy stringent requirements in relation to their intrinsic color and also to mechanical properties. To this end, said document proposes that at least one carboxylic acid obtained from natural raw materials and having at least two acid groups be reacted with at least one polyhydric alcohol, at least one organic phosphite compound, and also at least one Lewis acid.

WO 2010/107562 A1 discloses a thermoplastic polyurethane which has reduced tendency to bloom. To this end, a reaction is first carried out between a hydroxy-terminated polyester, a polyisocyanate, and a glycol chain extender, where the hydroxy-terminated polyester comprises repeating units obtainable from propylene 1,3-glycol and dicarboxylic acids.

EP 1 477 505 A1 discloses a process for producing a polyurethane from a polyester polyol. Said document does not deal with the problem that products of this type produced from renewable raw materials can have an undesired intrinsic color.

WO 2010/031792 A1 discloses polyurethanes based on a polyesterdiol using a dicarboxylic acid having an even number of carbon atoms and using a diol having an uneven number of carbon atoms, in each case made of renewable raw materials.

US 2011/0206734 A1 discloses a process for producing a thermoplastically processable polyurethane elastomer. This is obtained by reacting one or more linear polyesterdiol(s) having a functionality of from 1.8 to 2.2, based on succinic acid and 1,3-propanediol, with one or more organic diisocyanates and with one or more diols. The process in accordance with said document provides that, in a first step, a polyesterdiol of this type is reacted with a polyisocyanate to give a corresponding prepolymer which in essence has OCN groups as terminal groups.

Polyester compounds made of carboxylic acids and to some extent also of alcohols made of renewable raw materials, and specifically polyester compounds produced from renewable fats or oils, usually exhibit a yellowish/brown coloration due to compounds that are not specifiable in any great detail but that have relatively highly conjugated electron systems. Said discoloration is also apparent by way of example in thermoplastic polyurethanes produced therefrom. Because of the discoloration, products made of renewable raw materials are less acceptable in the market than products made of well-defined raw materials based on petroleum products, although the mechanic/dynamic properties of the products made of renewable raw materials are sometimes actually better than those of their petroleum equivalents.

It was therefore an object of the present invention to provide, starting from the prior art, a process in which appropriate polymer polyols, preferably made of renewable raw materials, and appropriate polyisocyanates can be used, and corresponding products are obtained which have no undesirable yellowish or brownish coloration, where the mechanical properties are intended to be at least at the level of the petrochemically derived products.

Said objects are achieved via the process of the invention for producing a polyurethane, comprising at least the following steps:

(A) bringing at least one polymer polyol into contact with an amount of from 0.1 to 20 mol %, based on the entire amount of polyisocyanate, of at least one first polyisocyanate, in order to obtain a prepolymer which in essence has terminal hydroxy groups, and (B) bringing the prepolymer from step (A) into contact with at least one second polyisocyanate and optionally with further additives, in order to obtain the polyurethane.

The process in accordance with the present invention produces a polyurethane by reacting a polymer polyol, preferably a polyester polyol, more preferably a polyesterdiol, with one or more polyisocyanate(s), where initially only a portion of the entire amount of at least one polyisocyanate is used, and particularly preferably at least one aliphatic diisocyanate is used, in order to form a prepolymer which in essence has terminal hydroxy groups. In order to obtain the desired polyurethane, the resultant prepolymer is then reacted in a further step with further polyisocyanate, particularly preferably with at least one aromatic diisocyanate. By virtue of the first step of the invention it is possible to obtain a polyurethane which has reduced yellow coloration or reduced brown coloration, even when the starting materials, in particular the polymer polyol used, preferably derive from renewable raw materials.

The individual steps of the process of the invention are described in detail below:

Step (A):

Step (A) of the process of the invention comprises bringing at least one polymer polyol into contact with an amount of from 0.1 to 20 mol %, based on the entire amount of polyisocyanate, of at least one first polyisocyanate, in order to obtain a prepolymer which in essence has terminal hydroxy groups.

In accordance with the invention, it is generally possible to use any of the polymer polyols that are known to the person skilled in the art and suitable for producing polyurethanes, in particular thermoplastic polyurethanes. In accordance with the invention, preference is given to polyester polyols and/or polyether polyols, particular preference is given to polyester polyols, and very particular preference is given to linear polyester polyols.

The polyester polyols, in particular polyesterdiols, can by way of example be produced from dicarboxylic acids having from 2 to 12 carbon atoms, preferably from 4 to 10 carbon atoms, and from polyhydric alcohols. Examples of dicarboxylic acids that can be used are: aliphatic dicarboxylic acids, such as succinic acid, glutaric acid, adipic acid, suberic acid, azelaic acid, and sebacic acid, or aromatic dicarboxylic acids, such as phthalic acid, isophthalic acid, and terephthalic acid. The dicarboxylic acids can be used individually or in the form of mixtures, for example in the form of a succinic, sebacic, and adipic acid mixture. To produce the polyesterdiols it can sometimes be advantageous to use, instead of the dicarboxylic acids, the corresponding dicarboxylic acid derivatives, such as carboxylic diesters having from 1 to 4 carbon atoms in the alcohol moiety, for example dimethyl terephthalate or dimethyl adipate, carboxylic anhydrides, such as succinic anhydride, glutaric anhydride, or phthalic anhydride, or acyl chloride. Examples of polyhydric alcohols are glycols having from 2 to 10 carbon atoms, preferably from 2 to 6 carbon atoms, e.g. ethylene glycol, diethylene glycol, 1,4-butanediol, 1,5-pentanediol, 1,6-hexanediol, 1,10-decanediol, 2,2-dimethyl-1,3-propanediol, 1,3-propanediol, 2-methyl-1,3-propanediol, 3-methyl-1,5-pentanediol, or dipropylene glycol. The polyhydric alcohols can be used individually or in the form of mixtures, for example in the form of a 1,4-butanediol mixture and/or 1,3-propanediol mixture.

It is also possible to make concomitant use of, alongside these materials, small amounts of up to 3% by weight, based on the entire reaction mixture, of higher-functionality polyols of low molecular weight, for example 1,1,1-trimethylolpropane or pentaerythritol.

In accordance with the invention it is preferable to use exclusively bifunctional starting compounds, i.e. polymerdiol and diisocyanate.

When, by way of example, dimethyl esters of dicarboxylic acids are used in the production of the preferred polyester polyols, it is also possible that, as a consequence of incomplete transesterification, small amounts of unreacted terminal methyl ester groups reduce the functionality of the polyesters to less than 2.0, for example to 1.95 or else to 1.90.

The process known to the person skilled in the art is used for the polycondensation to produce the polyester polyols that are preferably used in accordance with the invention, particularly preferably polyesterdiols, for example by initially using temperatures of from 150 to 270° C. at atmospheric pressure or slightly reduced pressure to remove the water of reaction and then slowly lowering the pressure, for example to from 5 to 20 mbar. A catalyst is in principle not necessary, but is preferably added. Examples of those that can be used for this purpose are tin(II) salts, titanium(IV) compounds, bismuth(III) salts, and others.

It can moreover be advantageous to use an inert carrier gas, for example nitrogen, to remove the water of reaction. Other methods that can also be used use an entrainer that is liquid at room temperature, for example toluene, in an azeotropic esterification process.

The material normally used is a polyesterdiol that is in essence linear. However, it is also possible to use mixtures of more than one polyesterdiol that is in essence linear.

In accordance with the invention, it is particularly preferable to use at least one polyesterdiol, or a mixture of a plurality of polyesterdiols, comprising from 40 to 100% by weight, preferably from 90 to 100% by weight, based on all of the polyesterdiols used, of sebacic 1,3-propionate, succinic 1,3-propionate, and/or adipic 1,3-propionate. Succinic 1,3-propionate is composed of succinic acid and 1,3-propanediol. Sebacic 1,3-propionate is composed of sebacic acid and 1,3-propanediol. Adipic 1,3-propionate is composed of adipic acid and 1,3-propanediol.

The at least one polymer polyol used in accordance with the invention, preferably the at least one polyester polyol, more preferably the at least one polyesterdiol, or the starting materials for producing same, can generally be obtained by a petrochemical route or derived from biological sources, i.e. from renewable raw materials. It is preferable to use starting materials in accordance with the invention, i.e. in particular the at least one polymer polyol, where these are obtained from renewable raw materials.

Sebacic acid is particularly preferably used, and can be produced by a petrochemical route or obtained via chemical processes from biological sources, such as castor oil.

1,3-Propanediol can also be obtained by a petrochemical route, for example with use of acrolein as starting material, or can derive from biological sources: by way of example, DuPont Tate & Lyle obtains 1,3-propanediol by fermentation from corn syrup on a large industrial scale. Particularly preferred polyesterdiols are produced with use of at least 40% by weight of bio-based dicarboxylic acid, in particular sebacic acid (based on the total weight of the dicarboxylic acid used), and/or of at least 40% by weight of bio-based polyhydric alcohol, in particular 1,3-propanediol (based on the total weight of the diol or propanediol used).

In accordance with the invention, the number-average molar masses $M_n$ of the polyesterdiols preferably used are from 950 to 4000 g/mol, preferably from 1100 to 3500 g/mol, particularly preferably from 1300 to 2000 g/mol. The functionality of the polyesterdiols preferably used is preferably from 1.8 to 2.2, particularly preferably from 1.9 to 2.1.

In accordance with the invention it is generally possible to use any of the polyisocyanates that are known to the person skilled in the art and suitable for the production of polyurethanes, in particular of thermoplastic polyurethanes.

In accordance with the invention, preference is given to organic polyisocyanates, and particularly preference is given to organic diisocyanates.

In accordance with the invention, examples that can be used of organic polyisocyanates, preferably diisocyanates, are the aliphatic, cycloaliphatic, araliphatic, heterocyclic, and aromatic polyisocyanates, preferably diisocyanates, described by way of example in Justus Liebigs Annalen der Chemie, 562, pp. 75 to 136.

It is preferable that the present invention provides the process in accordance with the invention, where the at least one first polyisocyanate is at least one aliphatic polyisocyanate, more preferably at least one aliphatic diisocyanate.

In another preferred embodiment, the present invention provides the process in accordance with the invention where the at least one second polyisocyanate is at least one aromatic polyisocyanate, more preferably at least one aromatic diisocyanate.

It is very preferable that the present invention provides the process in accordance with the invention where the at least one first polyisocyanate is at least one aliphatic polyisocyanate, more preferably at least one aliphatic diisocyanate, and the at least one second polyisocyanate is at least one aromatic polyisocyanate, more preferably at least one aromatic diisocyanate.

Individual examples that may be mentioned are: aliphatic diisocyanates, such as hexamethylene diisocyanate, cycloaliphatic diisocyanates, such as isophorone diisocyanate, 1,4-cyclohexane diisocyanate, 1-methylcyclohexane 2,4-diisocyanate, and 1-methylcyclohexane 2,6-diisocyanate, and also the corresponding isomer mixtures, dicyclohexylmethane 4,4'-diisocyanate, dicyclohexylmethane 2,4'-diisocyanate, and dicyclohexylmethane 2,2'-diisocyanate, and also the corresponding isomer mixtures, aromatic diisocyanates, such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate, and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane, and naphthylene 1,5-diisocyanate. It is preferable to use hexamethylene 1,6-diisocyanate, cyclohexane 1,4-diisocyanate, isophorone diisocyanate, dicyclohexylmethane diisocyanate, diphenylmethane diisocyanate isomer mixtures with a diphenylmethane 4,4'-diisocyanate content of more than 96% by weight, diphenylmethane 4,4'-diisocyanate, and naphthylene 1,5-diisocyanate.

The diisocyanates mentioned can be used individually or in the form of mixtures with one another. They can also be used together with up to 15 mol % (based on total diisocyanate) of a polyisocyanate, but it is preferably permissible to add at most an amount of polyisocyanate that still produces a thermoplastically processable product. Examples of polyisocyanates are triphenylmethane 4,4',4''-triisocyanate and polyphenyl polymethylene polyisocyanates.

The process known to the person skilled in the art can be used to produce or isolate the polyisocyanates preferably used in accordance with the invention.

In accordance with the invention it is possible that different polyisocyanates are used in steps (A) and (B).

The present invention therefore preferably provides the process in accordance with the invention where the at least one first and the at least one second polyisocyanate are different.

In accordance with the invention it is also possible that the polyisocyanates used in steps (A) and (B) are identical.

The present invention therefore preferably provides the process in accordance with the invention where the at least one first and the at least one second polyisocyanate are identical.

In step (A) of the process in accordance with the invention, the at least one polymer polyol is brought into contact with an amount of from 0.1 to 20 mol %, based on the entire amount of polyisocyanate, of at least one first polyisocyanate.

In accordance with the invention, the entire amount of polyisocyanate is preferably composed of the amount added in step (A) and the amount added in step (B), i.e. the entire amount is the amount of at least one first polyisocyanate plus the amount of at least one second polyisocyanate.

In accordance with the invention it is therefore preferable that the amount added in step (A) of the at least one first polyisocyanate is from 0.1 to 20 mol %, more preferably from 0.5 to 12 mol %, particularly preferably from 1.0 to 10 mol %, and that the amount added in step (B) of the at least one second polyisocyanate is from 80 to 99.9 mol %, more preferably from 88 to 99.5 mol %, particularly preferably from 90 to 99.9 mol %, based in each case on the entire amount of polyisocyanate.

In accordance with the invention, it is preferable to judge the entire amount of polyisocyanates and the amount of the at least one polymer polyol used in such a way that the equivalents ratio of the entirety of all of the NCO groups present to the entirety of all of the hydroxy groups present is from 0.9:1.0 to 1.1:1.0, preferably from 0.95:1.0 to 1.10:1.0.

Step (A) of the process in accordance with the invention is carried out in apparatuses known to the person skilled in the art for producing prepolymers, for example heatable/coolable stirred tanks, reactive extruders, etc.

Step (A) of the process in accordance with the invention is carried out at temperatures known to the person skilled in the art, for example from 20 to 250° C.

Step (A) of the process in accordance with the invention can be carried out in the presence of at least one solvent, for example selected from the group of inert solvents, i.e. solvents which have no reactive hydrogen atoms, preferably selected from the group consisting of toluene, dimethylformamide, tetrahydrofuran, etc. and mixtures thereof, or in the absence of a solvent.

Step (A) of the process in accordance with the invention gives a prepolymer which in essence has terminal hydroxy groups. In accordance with the invention, "in essence" means that the predominant proportion, for example more than 70%, preferably more than 80%, particularly preferably more than 90%, of the terminal groups present are terminal hydroxy groups. Any remaining terminal groups are terminal isocyanate groups.

In accordance with the invention it is possible that the prepolymer which in essence has terminal hydroxy groups is isolated after step (A).

It is therefore preferable that the present invention provides the process in accordance with the invention where the prepolymer which in essence has terminal hydroxy groups is isolated after step (A).

Methods for isolating the prepolymer obtained after step (A) are known per se to the person skilled in the art, an example being use of distillation, optionally in vacuo, to remove any solvent that may have been used. Since step (A) is preferably carried out without a solvent, the isolation in accordance with this embodiment preferably comprises the storage and provision of the reaction mixture from step (A) so that it can be used in step (B).

After any isolation carried out in accordance with the invention, the prepolymer can by way of example be stored, in order that it can be used subsequently in step (B) of the process.

In accordance with the invention it is also possible that the prepolymer which in essence has terminal hydroxy groups is not isolated after step (A) and is used directly in step (B).

The present invention therefore preferably provides the process in accordance with the invention where the prepolymer which in essence has terminal hydroxy groups is not isolated after (A) and is used directly in step (B).

In this embodiment in accordance with the invention, the prepolymer obtained in step (A) is not isolated but instead is transferred directly to step (B). In one particularly preferred embodiment, the steps (A) and (B) are carried out in one apparatus, i.e. the addition in accordance with step (A) takes place initially, and shortly thereafter, i.e. after at most a few minutes, the addition in accordance with step (B) takes place.

Step (B):

Step (B) of the process in accordance with the invention comprises bringing the prepolymer from step (A) into contact with at least one second polyisocyanate and optionally with further additives, in order to obtain the polyurethane.

In accordance with the invention, as previously stated in relation to step (A), step (B) can use at least one polyisocyanate other than that used in step (A), or can use the same at least one polyisocyanate.

In accordance with the invention, in step (B) of the process in accordance with the invention an appropriate amount of at least one second polyisocyanate is added, this amount being such that when it is added to the amount of at least one first polyisocyanate added in step (A) the total is the entire amount of polyisocyanate. This means that it is preferable not to add further polyisocyanate at any further point of the process in accordance with the invention.

In step (B) of the process in accordance with the invention it is optionally possible to add further additives.

Examples of optionally present additives in accordance with the invention are those selected from the group consisting of chain extenders, catalysts, hydrolysis stabilizers, UV stabilizers, antioxidants, waxes, other conventional auxiliaries, and mixtures thereof.

Examples of chain extenders that can be used are well known aliphatic, araliphatic, aromatic, and/or cycloaliphatic compounds with a molar mass of from 50 to 499 g/mol, preferably bifunctional compounds, for example alkanediols having from 2 to 10 carbon atoms in the alkylene moiety, preferably 1,4-butanediol, 1,6-hexanediol, and/or di-, tri-, tetra-, penta-, hexa-, hepta-, octa-, nona- and/or decaalkylene glycols having from 3 to 8 carbon atoms, preferably unbranched alkanediols, in particular 1,3-propanediol and 1,4-butanediol.

Suitable catalysts which in particular accelerate the reaction between the at least one polymer polyol and the polyisocyanates are the tertiary amines that are known in the prior art and are conventional, for example triethylamine, dimethylcyclohexylamine, N-methylmorpholine, N,N'-dimethylpiperazine, 2-(dimethylaminoethoxy)ethanol, diazabicyclo[2.2.2]octane, and the like, and also in particular organometallic compounds, such as titanic esters, iron compounds, e.g. iron (MI) acetylacetonate, tin compounds, e.g. tin diacetate, tin dioctoate, tin dilaurate, or the dialkyltin salts of aliphatic carboxylic acids, e.g. dibutyltin diacetate, dibutyltin dilaurate, or the like. The amounts usually used of the catalysts are from 0.00001 to 0.1 part by weight per 100 parts by weight of polymer polyol.

Examples of conventional auxiliaries are blowing agents, surfactant substances, flame retardants, nucleating agents, lubricants, mold-release aids, dyes and pigments, stabilizers, e.g. to provide protection from hydrolysis, light, heat, or discoloration, inorganic and/or organic fillers, reinforcing agents, plasticizers, and metal deactivators.

Hydrolysis stabilizers used are preferably oligomeric and/or polymeric aliphatic or aromatic carbodiimides. It is preferable to add stabilizers to the polyurethane, in order to stabilize the polyurethane in accordance with the invention with respect to aging. For the purposes of the present invention, stabilizers are added to it which protect a plastic or a plastics mixture from damaging environmental effects. Examples are primary and secondary antioxidants, thiosynergists, organophosphorus compounds of trivalent phosphorus, hindered amine light stabilizers, UV absorbers, hydrolysis stabilizers, quenchers, and flame retardants. Examples of commercial stabilizers are given in Plastics Additive Handbook, 5th edition, H. Zweifel, ed., Hanser Publishers, Munich, 2001 ([1]), pp. 98 to 136. If the polyurethane in accordance with the invention has exposure to detrimental thermoxidative effects during its application, antioxidants can be added. It is preferable to use phenolic antioxidants. Examples of phenolic antioxidants are given in Plastics Additive Handbook, 5th edition, H. Zweifel, ed., Hanser Publishers, Munich, 2001, pp. 98 to 107 and pp. 116 to 121. Preference is given to those phenolic antioxidants of which the molar mass is greater than 700 g/mol. An example of a phenolic antioxidant preferably used is pentaerythrityl tetrakis(3-(3,5-bis(1,1-dimethylethyl)-4-hydroxyphenyl)propionate) (Irganox® 1010), or other relatively high-molecular-weight condensates derived from appropriate antioxidants. The concentrations used of the phenolic antioxidants are generally from 0.1 to 5% by weight, preferably from 0.1 to 2% by weight, in particular from 0.5 to 1.5% by weight, based in each case on the total weight of the polyurethane. It is moreover preferable to use antioxidants which are amorphous or liquid. Irrespective of whether the polyurethanes in accordance with the invention are, by virtue of their preferred composition, markedly more stable with respect to ultraviolet radiation than, for example, polyurethanes plasticized with phthalates or with benzoates, a stabilizer system comprising only phenolic stabilizers is often not adequate. For this reason, the polyurethanes in accordance with the invention, where these are exposed to UV light, are preferably also stabilized by a UV absorber. UV absorbers are molecules which absorb high-energy UV light and dissipate the energy. Familiar UV absorbers used in industry belong by way of example to the group of the cinnamic esters, of the diphenylcyanoacrylates, of the oxalamides (oxanilides), in particular 2-ethoxy-2'-ethyloxanilide, of the formamidines, of the benzylidenemalonates, of the diarylbutadienes, of the triazines, or else of the benzotriazoles. Examples of commercial UV absorbers are found in Plastics Additive Handbook, 5th edition, H. Zweifel, ed., Hanser Publishers, Munich, 2001, pp. 116 to 122. In one preferred embodiment, the number-average molar mass of the UV absorbers is greater than 300 g/mol, in particular greater than 390 g/mol. The molar mass of the UV absorbers preferably used should moreover be no greater than 5000 g/mol, particularly preferably no greater than 2000 g/mol. The group of the benzotriazoles is particularly suitable as UV absorber. Examples of particularly suitable benzotriazoles are Tinuvin® 213, Tinuvin® 328, Tinuvin® 571, and also Tinuvin® 384, and Eversorb® 82. It is preferably to use amounts of from 0.01 to 5% by weight of the UV absorbers, based on the total amount of polyurethane composition, and it particularly preferable to use from 0.1 to 2.0% by weight, in particular from 0.2 to 0.5% by weight, based in each case on the total weight of the polyurethane. The UV stabilizer system described above, based on an antioxidant and on a UV absorber, is often still not adequate to ensure that the polyurethane in accordance with the invention has good resistance to the detrimental effect of UV radiation. In that case, it is also possible to add a hindered amine light stabilizer (HALS) in addition to the antioxidant and the UV absorber. A particularly preferred UV stabilizer system comprises a mixture of a phenolic stabilizer, a benzotriazole, and a HALS compound in the preferred amounts described above. However, it is also possible to use compounds which combine the functional groups of the stabilizers, for example sterically hindered piperidyl-hydroxybenzyl condensates, e.g. di(1,2,2,6,6-pentamethyl-4-piperidyl) 2-butyl-2-(3,5-di-tert-butyl-4-hydroxybenzyl)malonate, Tinuvin® 144.

Other particularly suitable materials are waxes, which have important functions not only during the industrial production of the polyurethanes but also during processing of the same. The wax serves as friction-reducing internal and external lubricant and thus improves the flow properties of the polyurethane. It is also intended to act as release agent preventing adhesion of the polyurethane to the surrounding material (e.g. the mold), and to act as dispersing agent for other additives, e.g. pigments and antiblocking agents. Examples of suitable materials are fatty acid esters, such as stearic esters and montanic esters, and the corresponding metal soaps, and also fatty acid amides, such as stearylamides and oleamides, and also polyethylene waxes. An overview of the waxes used in the thermoplastics is found in H. Zweifel (ed.): Plastics Additives Handbook, 5th edition, Hanser Verlag, Munich 2001, pp. 443 ff., EP-A 308 683, EP-A 670 339, and JP-A 5 163 431.

Improvements can also be achieved through the use of ester/amide combinations in accordance with DE-A 19 607 870 and through the use of specific wax mixtures of montanic acid derivatives and of fatty acid derivatives (DE-A 19 649 290), and also through the use of hydroxystearylamides in accordance with DE 102006009096 A1.

Further details concerning the abovementioned auxiliaries and additives can be found in the technical literature, e.g. in Plastics Additive Handbook, 5th edition, H. Zweifel, ed., Hanser Publishers, Munich, 2001. All of the molecular weights and molar masses in this specification have the unit [g/mol].

Step (B) of the process in accordance with the invention can generally be carried out at any temperature known to the person skilled in the art, for example from 20 to 250° C., preferably from 40 to 230° C.

The present invention therefore also preferably provides the process in accordance with the invention where step (B) takes place at a temperature of from 40 to 230° C.

Optional Step (C):

In another preferred embodiment, the present invention provides the process in accordance with the invention where the following step (C) is carried out after step (B):

(C) conditioning, at a temperature of from 30 to 120° C., of the polyurethane obtained in step (B).

The preferred conditioning in accordance with the invention, in accordance with step (C) of the process in accordance with the invention serves for maturing of the polyurethane obtained in step (B), i.e. to obtain the final properties of the polyurethane.

Step (C) is preferably carried out at from 40 to 100° C., particularly preferably at from 60 to 90° C.

Step (C) can take place in any of the apparatuses known to the person skilled in the art, for example on a heating plate, in a temperature-controlled cabinet, in a heated storage tank (silo), or in similar equipment, where this permits storage of the polyurethane at elevated temperatures.

Step (C) generally takes place until the desired effect occurs, for example for from 1 to 48 hours, preferably from 2 to 36 hours, particularly preferably from 10 to 30 hours.

The polyurethane obtained after step (B) and, respectively, (C) of the process in accordance with the invention usually takes the form of granules or of powder and can be further processed by the process known to the person skilled in the art, for example injection molding, calendering, or extrusion, to give the desired cladding in automobiles, foils, moldings, rollers, fibers, hoses, cable plugs, bellows, drag cables, cable sheathing, gaskets, drive belts, or damping elements.

The thermoplastic polyurethanes that can be produced by the processes in accordance with the invention, preferably cladding in automobiles, coatings, cables, plug connectors, solar modules, foils, moldings, shoe soles and shoe components, balls and ball components, rollers, fibers, profiles, laminates and wiper blades, hoses, cable plugs, bellows, drag cables, cable sheathing, gaskets, nonwoven fabrics, drive belts, or damping elements, have the advantages described in the introduction.

The present invention therefore also provides a polyurethane obtainable by the process in accordance with the invention.

In one preferred embodiment, the present invention provides the polyurethane in accordance with the invention with a Yellowness Index of from 1 to 60, preferably from 1 to 40.

The polyurethane produced in accordance with the invention can be used advantageously in all of the specific applications of thermoplastic polyurethanes. The present invention therefore also provides the use of the polyurethane in accordance with the invention as cladding in automobiles, coatings, cables, plug connectors, solar modules, foils, moldings, shoe soles and shoe components, balls and ball components, rollers, fibers, profiles, laminates and wiper blades, hoses, cable plugs, bellows, drag cables, cable sheathing, gaskets, nonwoven fabrics, drive belts, or damping elements.

EXAMPLES

Starting Materials Used
Polymer Polyol 1:
A polyesterdiol composed of sebacic acid, adipic acid, and 1,3-propanediol was used as polymer polyol 1, molar mass=1400 g/mol, OH number=79.3
Chain extender (CE) 1 is 1,3-propanediol, molar mass=76.09 g/mol
Isocyanate 1 is diphenylmethane 4,4'-diisocyanat (4,4'-MDI), molar mass=250.26 g/mol
Isocyanate 2 is hexane diisocyanate (HDI), molar mass=168.20 g/mol
Hydrolysis stabilizer 1 is a carbodiimide-based hydrolysis stabilizer (Elastostab® H01)
Processes
Process 1 (Comparison)
Polymer polyol 1 is reacted together with chain extender 1 and isocyanate 1. Hydrolysis stabilizer 1 is likewise added to the reaction mixture. The resultant reaction mixture is poured out onto a heatable plate and reacted to completion for 10 minutes at 120° C. The resultant polymer sheet is then conditioned for 24 hours at 80° C. The polymer sheet is then granulated and the granules are molded by the injection-molding process to give a test sheet.

Process 2 (In Accordance with the Invention)
In a first step, polymer polyol 1 is reacted with 5 mol % of isocyanate 2. This gives a difunctional prepolymer 1 having terminal hydroxy groups. Said prepolymer 1 can be stored and does not have to be further processed immediately.

In a separate reaction step, the resultant prepolymer 1 is reacted with chain extender 1 and isocyanate 1. Hydrolysis stabilizer 1 is likewise added.

The resultant reaction mixture is poured out onto a heatable plate and reacted to completion for 10 minutes at 120° C. The resultant polymer sheet is then conditioned for 24 hours at 80° C. The polymer sheet is then granulated and the granules are molded by the injection-molding process to give a test sheet.

Process 3 (In Accordance with the Invention)
Polymer polyol 1 is initially reacted with 1 mol % of isocyanate. Shortly after addition of isocyanate 2, isocyanate 1, chain extender 1, and hydrolysis stabilizer 1 are added and likewise reacted.

The resultant reaction mixture is poured out onto a heatable plate and reacted to completion for 10 minutes at 120° C. The resultant polymer sheet is then conditioned for 24 hours at 80° C. The polymer sheet is then granulated and the granules are molded by the injection-molding process to give a test sheet.

Example 1 (Comparison)

55.90% by weight of polymer polyol 1, 7.80% by weight of CE 1, 35.4% by weight of isocyanate 1, and 0.90% by weight of hydrolysis stabilizer 1 are reacted by process 1. Table 1 shows the results.

Example 2 (In Accordance with the Invention)

56.70% by weight of prepolymer 1, 7.65% by weight of chain extender 1, 35.20% by weight of isocyanate 1, and 0.45% by weight of hydrolysis stabilizer 1 are reacted by process 2. Table 1 shows the results.

Example 3 (Comparison)

55.90% by weight of polymer polyol 1, 7.60% by weight of chain extender 1, 35.20% by weight of isocyanate 1, and 1.30% by weight of hydrolysis stabilizer 1 are reacted by process 1. Table 1 shows the results.

Example 4 (In Accordance with the Invention)

56.60% by weight of polymer polyol 1, 7.66% by weight of chain extender 1, 35.07% by weight of isocyanate 1, 0.25% by weight of isocyanate 2, and 0.45% by weight of hydrolysis stabilizer 1 are reacted by process 3. Table 1 shows the results.

TABLE 1

| | Example 1 | Example 2 | Example 3 | Example 4 |
|---|---|---|---|---|
| Yellowness Index | 43.3 | 28.6 | 44 | 25.1 |
| Hardness (Shore A) | 93 | 90 | 92 | 90 |
| Tensile strength [MPa] | 47 | 49 | 42 | 35 |
| Elongation at break [%] | 500 | 490 | 730 | 520 |
| Tear strength [N/nm] | 105 | 92 | 102 | 94 |
| Abrasion loss [mm$^3$] | 32 | 32 | 26 | 60 |

The methods used to determine the individual parameters were as follows:
Yellowness index: ASTM E313
Hardness: DIN 53505
Tensile strength: DIN 53504
Elongation at break: DIN 53504
Tear strength: DIN ISO 34-1, B (b)
Abrasion loss: DIN ISO 4649

As can be seen from the examples, the mechanical properties for the respective pairs of experiments are almost unaltered. Surprisingly, however, the Yellowness Index decreases from initially above 40 to from 25 to 28. This change is clearly visible to the eye.

The invention claimed is:

1. A process for producing a polyurethane, comprising:
   (A) reacting a polyesterpolyol and/or polyetherpolyol with an amount of from 0.5 to 12 mol %, based on the entire amount of polyisocyanate, of a first polyisocyanate which is an aliphatic polyisocyanate, in order to obtain a prepolymer, wherein more than 70% of terminal groups present are terminal hydroxy groups; and
   (B) reacting the prepolymer from the reacting (A) with a second polyisocyanate and optionally with a further additive, in order to obtain the polyurethane, wherein the entire amount of polyisocyanate is composed of the amount added in the reacting (A) and the amount added in the reacting (B),
   wherein the first and the second polyisocyanate are different and
   the prepolymer, in which more than 70% of the terminal groups present are terminal hydroxy groups, is not isolated after the reacting (A) and is used directly in the reacting (B).

2. The process according to claim 1, wherein the reacting (B) takes place at a temperature of from 20 to 250° C.

3. The process according to claim 1, further comprising after the reacting (B):
   (C) conditioning, at a temperature of from 30 to 120° C., of the polyurethane obtained in the reacting (B).

* * * * *